US006209052B1

United States Patent
Chin et al.

(12) United States Patent
(10) Patent No.: US 6,209,052 B1
(45) Date of Patent: Mar. 27, 2001

(54) SYSTEM AND METHOD FOR SUPPRESSING PROCESSOR CYCLES TO MEMORY UNTIL AFTER A PERIPHERAL DEVICE WRITE CYCLE IS ACKNOWLEDGED BY THE MEMORY ARBITER

(75) Inventors: Kenneth T. Chin, Cypress, TX (US); Clarence K. Coffee, Pembroke Pines, FL (US); Michael J. Collins, Tomball, TX (US); Jerome J. Johnson; Phillip M. Jones, both of Spring, TX (US); Robert A. Lester, Houston, TX (US); Gary J. Piccirillo, Cypress, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/164,194

(22) Filed: Sep. 30, 1998

(51) Int. Cl.[7] .................................................. G06F 13/00
(52) U.S. Cl. ........................ 710/109; 710/107; 710/128; 710/129
(58) Field of Search ................................. 710/126–129, 710/110–113, 119, 240, 241–242, 243, 36–39, 107, 109

(56) References Cited

U.S. PATENT DOCUMENTS

| | | | |
|---|---|---|---|
| 5,317,720 | * 5/1994 | Stamm et al. | 711/125 |
| 5,625,824 | * 4/1997 | Melo et al. | 710/240 |
| 5,732,226 | * 3/1998 | Wszolek et al. | 710/107 |
| 5,761,725 | * 6/1998 | Zeller et al. | 711/146 |
| 5,822,549 | * 10/1998 | LaBerge | 710/107 |
| 5,828,856 | * 10/1998 | Bowes et al. | 710/129 |
| 5,872,936 | * 2/1999 | Eckstein | 710/107 |
| 5,878,235 | * 3/1999 | Porterfield et al. | 710/112 |
| 5,914,730 | * 6/1999 | Santos et al. | 345/521 |
| 5,930,486 | * 7/1999 | Looi et al. | 710/113 |
| 5,956,493 | * 9/1999 | Hewitt et al. | 710/113 |
| 5,991,833 | * 11/1999 | Wandler et al. | 710/52 |
| 6,047,349 | * 4/2000 | Klein | 710/129 |
| 6,098,136 | * 8/2000 | Okazawa et al. | 710/128 |
| 6,128,688 | * 10/2000 | Kondo et al. | 710/129 |

* cited by examiner

Primary Examiner—Robert Beausoleil
Assistant Examiner—Raymond N Phan
(74) Attorney, Agent, or Firm—Kevin L. Daffer; Conley, Rose & Tayon (57) ABSTRACT

A computer is provided having a bus interface unit coupled between a CPU bus, a peripheral bus (i.e., PCI bus and/or graphics bus), and a memory bus. The bus interface unit includes controllers linked to the respective buses, and a plurality of queues placed within address and data paths between the various controllers. The peripheral bus controller can decode a write cycle to memory, and the processor controller can thereafter request and be granted ownership of the CPU local bus. The address of the write cycle can then be snooped to determine if valid data exists within the CPU cache storage locations. If so, a writeback operation can occur. Ownership of the CPU bus is maintained by the bus interface unit during the snooping operation, as well as during writeback and the request of the memory bus by the peripheral-derived write cycle. It is not until ownership of the memory bus is granted by the memory arbiter that mastership is terminated by the bus interface unit. Accordingly, the bus interface unit keeps CPU-derived cycles off the CPU bus to ensure memory arbiter grants ownership to a write cycle from the peripheral bus. In this fashion, data from the peripheral bus can be stored in system memory before accessing that data by a CPU read cycle. The number of snoop cycles which the bus interface unit can initiate is determined by configuration registers programmed during power on, reset or boot up of computer.

18 Claims, 5 Drawing Sheets

SYSTEM AND METHOD FOR SUPPRESSING PROCESSOR CYCLES TO MEMORY UNTIL AFTER A PERIPHERAL DEVICE WRITE CYCLE IS ACKNOWLEDGED BY THE MEMORY ARBITER

BACKGROUND OF THE INVENTION

1. Field of the Invention

This invention relates to a computer and, more particularly, to a bus interface unit which prevents cycles from being dispatched across a local central processing unit ("CPU") bus from one or more CPUs until after the system memory arbiter grants memory bus ownership to a write cycle initiated from a peripheral device.

2. Description of the Related Art

Modem computers are called upon to execute instructions and transfer data at increasingly higher rates. Many computers employ CPUs which operate at clocking rates exceeding several hundred MHz, and further have multiple buses connected between the CPUs and numerous input/output devices. The buses may have dissimilar protocols depending on which devices they link. For example, a CPU local bus connected directly to the CPU preferably transfers data at a faster rate than a peripheral bus connected to slower input/output devices. A mezzanine bus may be used to connect devices arranged between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interconnect ("PCI") bus to which higher speed input/output devices can be connected.

Coupled between the various buses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

The north bridge, henceforth termed a bus interface unit, serves to link specific buses within the hierarchical bus architecture. Preferably, the bus interface unit couples data, address and control signals forwarded between the CPU local bus, the PCI bus and the memory bus. Accordingly, the bus interface unit may include various buffers and/or controllers situated at the interface of each bus linked by the interface unit. In addition, the bus interface unit may receive data from a dedicated graphics bus, and therefore may include an advanced graphics port ("AGP"). As a host device, the bus interface unit may be called upon to support both the PCI portion of the AGP (or graphics-dedicated transfers associated with PCI, henceforth is referred to as a graphics component interface, or "GCI"), as well as AGP extensions to the PCI protocol.

Mastership of the various buses is preferably orchestrated by several arbiters within the bus interface unit. For example, if a peripheral input/output device coupled to the PCI bus wishes to write data to the local memory, it must solicit mastership of the PCI bus before doing so. Once mastership is granted, the peripheral device can then forward the appropriate data to buffers or queues within the bus interface unit. That data may remain within the queues until another arbiter grants mastership of the memory bus. As a further example, before a CPU can read data from the local memory, the CPU must be granted mastership of the CPU bus before allowing data to be read from the memory bus.

Before a peripheral device can write data to local memory, it must not only arbitrate for the peripheral bus and the memory bus, but also must determine if the data within local memory is valid data. The process of determining where valid data exist, either within local memory or a cache storage location within the CPU, is often noted as a "snoop" operation. If the address written to in local memory is the same as an address of a cache storage location within the CPU, then it must be determined which address contains the most recent version of data. If cache within the CPU contains valid data (i.e., the most recent, modified, or dirty data) and data at the same address within system memory is not valid (i.e., is not the most recent, is invalid, or is stale data), then the CPU must writeback its valid data to the same address within system memory so that coherency can be maintained.

Once the address location within local memory is updated with valid data from the CPU cache, then the CPU cache storage location is marked with an "invalid" status bit while data transfers occur to the updated address location within the local memory. The process of writeback is beneficially used whenever a peripheral device desires to transfer data to an address location within system memory shared by one or more cache storage locations within one or more associated CPUs. A problem exists, however, in that the memory arbiter will automatically grant mastership of the memory bus to a CPU initiated cycle in lieu of a cycle derived from a peripheral device. In this fashion, the memory arbiter will allow faster CPU cycles to be serviced ahead of slower peripheral device cycles to ensure the CPU is not being starved for data and/or instructions. For example, if the memory arbiter holds off a CPU derived memory read cycle in favor of a write cycle arising from a peripheral device, then the CPU must wait a substantial amount of time until the slower PCI bus and/or queues within the bus interface unit can forward their contents to system memory. The amount of time needed to complete that transfer from the slower peripheral device and/or peripheral bus may unjustifiably stall the CPU, and execution units within the CPU.

Using the immediately preceding example, there may be instances in which data within the system memory should be written by a peripheral device before being read by the CPU. If, however, the peripheral device initiates a write cycle to memory and subsequently a CPU initiates a read cycle to that same location, then the memory arbiter will automatically grant priority to the CPU derived cycle and hold off the data transfer phase of the peripheral cycle. This will cause the CPU to read data from system memory which had not been properly updated by a write cycle from the peripheral device. An update of data from the peripheral device will therefore not be properly queued into the CPU. In other words, if the read cycle to a storage location by the CPU occurs before a write to that storage location by a peripheral device and after that address has been snooped out of the CPU, the computer system will be incoherent.

It would be desirable to implement an improved bus interface unit which can hold off CPU derived memory read cycles on the CPU bus until after the peripheral device is granted ownership of the memory bus. The improved bus interface unit could therefore assure that peripheral-derived data is written into the system memory before that data is read by the CPU. This effect is most profound when the data being read by the CPU is contingent on it originating from a peripheral device, and the read cycle request signal of the CPU occurs concurrent with or slightly after the peripheral write cycle request signal. It would be further beneficial that multiple snoop cycles be dispatched upon the CPU bus by the bus interface unit before the CPU is granted mastership of the CPU bus. The desirable amount of snoop cycles occurring during ownership by the bus interface unit should vary depending on whether the computer system and/or application primarily involves peripheral bus transfers or CPU bus transfers.

SUMMARY OF THE INVENTION

The problems outlined above are in large part solved by an improved bus interface unit. The bus interface unit includes a memory arbiter which grants ownership of the memory bus to a peripheral device cycle rather than a concurrent CPU cycle when certain conditions exist. The bus interface unit therefore involves a mechanism for stalling CPU cycles on the CPU bus until after the peripheral device obtains mastership of the memory bus. In this fashion, the memory arbiter will grant mastership to a peripheral cycle since a CPU derived cycle is prevented from reaching the memory arbiter.

The bus interface unit includes a processor controller which forwards a bus request signal to the CPU bus whenever the processor controller receives a snoop cycle originally issued from the peripheral bus. The bus request signal forwarded from the processor controller is deemed a "priority" request signal relative to other request signals which can be forwarded onto the CPU bus by other CPU bus agents. Accordingly, the bus interface unit is deemed a CPU bus priority agent and the one or more CPUs (and associated caches) are deemed CPU bus symmetric agents.

Upon receiving the priority bus request signal from the bus interface unit, each and every CPU linked to the CPU bus is stalled from sending address and data across the CPU bus. The priority bus request signal can be attributed to a specific type of CPU bus, such as the Pentium® Pro P6 bus, wherein the priority bus request signal is noted as "BPRI#."

When the processor controller of the bus interface unit dispatches the priority bus request signal, it may also forward an address of a memory location requiring snoop. If the cache memory location within one or more CPUs matches the address location of system memory being written to, then a writeback procedure may occur causing data to be written from the cache memory to system memory before the memory arbiter grants mastership to the peripheral bus write cycle. The priority bus request is maintained asserted not only during the snoop cycle initiated from the processor controller, but also throughout the time it takes for the memory arbiter to grant mastership to the peripheral-derived memory write cycle. Thus, the bus request signal is maintained asserted throughout the time needed to request mastership from the memory arbiter, and the memory arbiter to return an acknowledge or grant signal to the queue or peripheral controller which maintains the memory write cycle.

The bus request signal initiated by the processor controller within the bus interface unit can be of variable duration. According to one embodiment, the bus request signal is maintained for up to a pre-defined number of snoop cycles initiated by the processor controller across the CPU local bus. According to a preferred embodiment, the number of snoop cycles which can be run with a single assertion of the bus request signal to the CPU (or CPUs) is preferably programmable from one to four. The bus interface unit may therefore include a state machine and a configuration register. The configuration register is configured with a count value during reset of the computer system. That register is then used in conjunction with a counter. Upon assertion of the bus request signal, the counter is initiated and a count quantity is then presented for each snoop cycle issued across the CPU local bus. Once the programmed count value has been reached, then the bus request signal is de-asserted. The count value is maintained within the configuration register possibly until it is re-programmed during a subsequent computer reset.

Broadly speaking, a computer is presented. The computer includes a CPU coupled to a CPU bus. A memory may also be included and coupled to a memory bus. A peripheral device coupled to a peripheral bus may be used to forward a write cycle to the memory via the memory bus. A bus interface unit coupled between the CPU bus, the memory bus, and the peripheral bus generates a bus request signal to the CPU bus when it receives a write cycle from the peripheral bus. The bus request signal is maintained asserted until the memory bus grants ownership to the write cycle.

A method is introduced for performing a write cycle from a peripheral device to system memory. The method includes forwarding a bus request signal from the bus interface unit upon receiving a write cycle from a peripheral device destined for memory. The bus request signal serves to obtain and maintain ownership of the CPU bus. The bus request signal remains asserted to continue ownership of the CPU bus until after the write cycle has been granted ownership of the local memory bus connected to the system memory.

According to another embodiment, the bus interface unit may be further configured to obtain ownership of the CPU bus during times in which a pre-defined number of snoop cycles are forwarded across the CPU bus. The number of pre-defined snoop cycles which can be allowed during the bus request signal assertion is established during reset of the computer. A method therefore occurs for maintaining the bus request signal and ownership of the CPU bus until after the pre-defined number of snoop cycles to the cache memory are terminated.

As noted henceforth, a peripheral bus write cycle to local memory occurs, e.g., during direct memory access ("DMA") operations. DMA operations may involve a writeback transfer before carrying out the DMA transfer. The system memory or local memory being accessed includes any memory denoted as semiconductor memory.

Suitable semiconductor memory include, for example, DRAM, Synchronous DRAM ("SDRAM"). The bus interface unit is configured as a north bridge between the CPU local bus, a graphics bus (e.g. AGP), a PCI bus, and a memory bus. If the graphics bus is an AGP or PCI bus, then it may be linked to the bus interface unit by an AGP interface to effectuate, e.g., 66 MHz 1×AGP transfers or 133 MHz 2×AGP data transfers. Bus interface unit maintains a PCI interface which is synchronous to the CPU interface and supports PCI burst cycles.

Upon receiving a write cycle from a peripheral device, the bus interface unit decodes the write instruction in a PCI or graphics controller within the interface unit and then generates a snoop request to a processor controller also within the interface unit. Once the processor controller grants that request, a snoop is performed of the caches within one or more CPUs. If the snoop operation produces a hit to a modified cache line (i.e., a cache line within the L1 or L2 caches containing valid data) then the writing of an entire cache line of possibly several quadwords from the peripheral device is stalled until writeback from the CPU cache of an entire cache line has completed.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
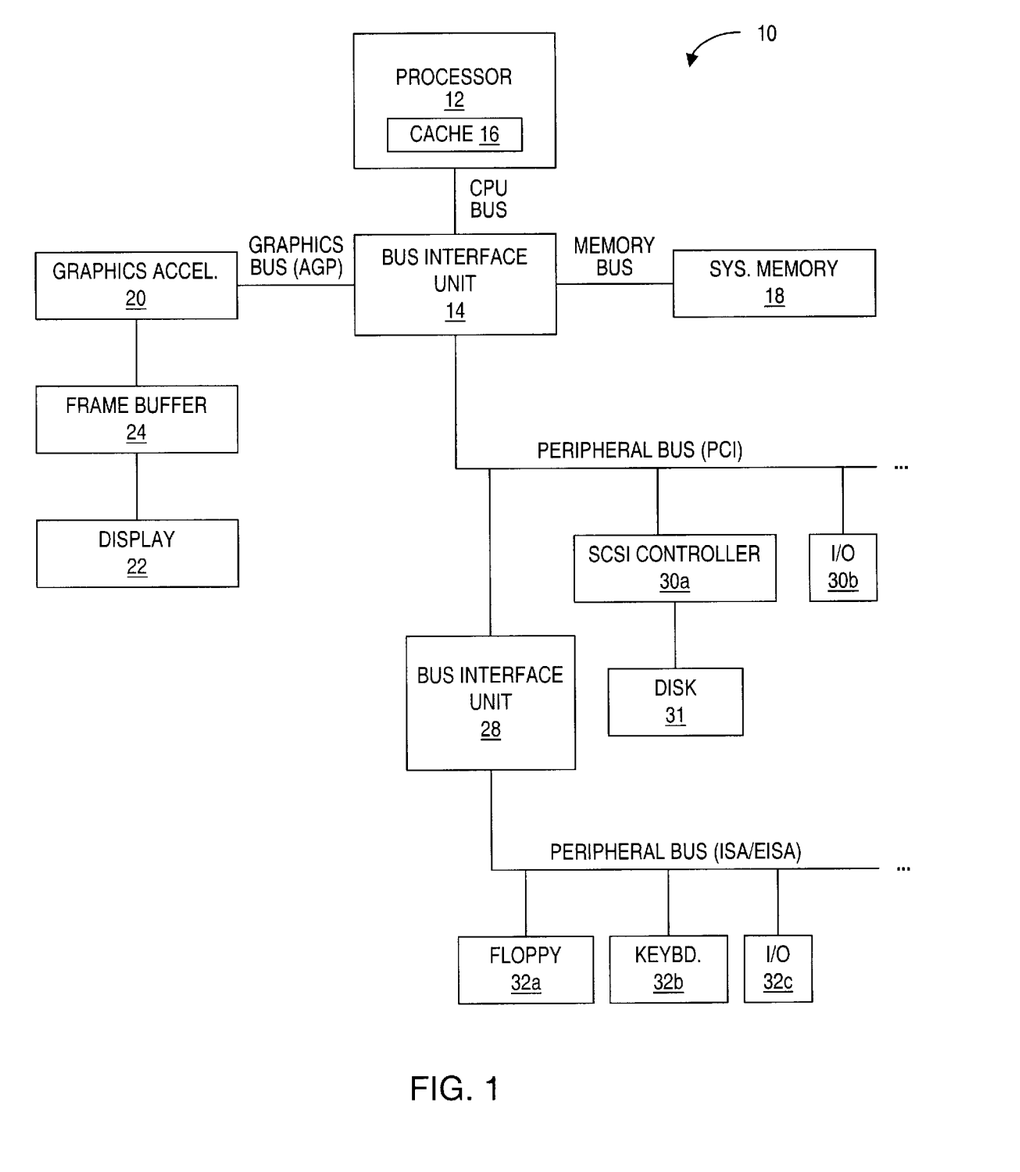
FIG. 1 is a block diagram of a computer system comprising various buses and bus interface unit.

Turning now to the drawings, FIG. 1 illustrates a computer 10 having multiple buses, including a CPU bus, a mezzanine or PCI bus, and a peripheral bus or ISA/EISA bus. The CPU bus connects a CPU or processor 12 to a bus interface unit or north bridge 14. A cache memory 16 is preferably embodied within processor 12 and/or linked to processor 12 by the CPU bus. Bus interface unit 14 provides an interface between components clocked at similar rates. Bus interface unit 14 preferably contains a memory controller which allows communication to and from system memory 18. A suitable system memory 18 comprises DRAM or SDRAM. Interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

AGP is generally a PCI bus with expanded protocol, and can be intended for the exclusive use of a display device 22 coupled to the graphics port (AGP) by a graphics accelerator and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT") a liquid crystal display ("LCD"), etc.

Interface unit 14 is generally considered an application specific chip set or application specific integrated circuit ("ASIC") that provides connectivity to various buses, and integrates other system functions such as memory interface and P1394. Systems memory 18 is considered the main memory and refers to a portion of the addressable memory that the majority of memory accesses target. System memory is accessed via interface unit 14, and is considered the largest continuous memory space of computer 10.

Unlike the CPU bus which runs at speeds comparable to CPU 12, PCI bus generally runs at speeds of, e.g., 33 MHz or lower. Another bus interface unit 28 is coupled between two dissimilar peripheral buses (i.e., the PCI bus and the ISA/EISA bus). Similar to unit 14, unit 28 is an ASIC or group of ASICs that provide connectivity between various buses, and may also include system function which can possibly integrate one or more serial ports. Attributed to the PCI bus are input/output ("I/O") devices 30, one of which can be a SCSI controller link between, for example, a secondary disk drive and the PCI bus. I/O devices 30 generally operate at higher speeds than I/O devices 32, examples of which include a floppy disk drive, a keyboard, etc.

Figure 2:
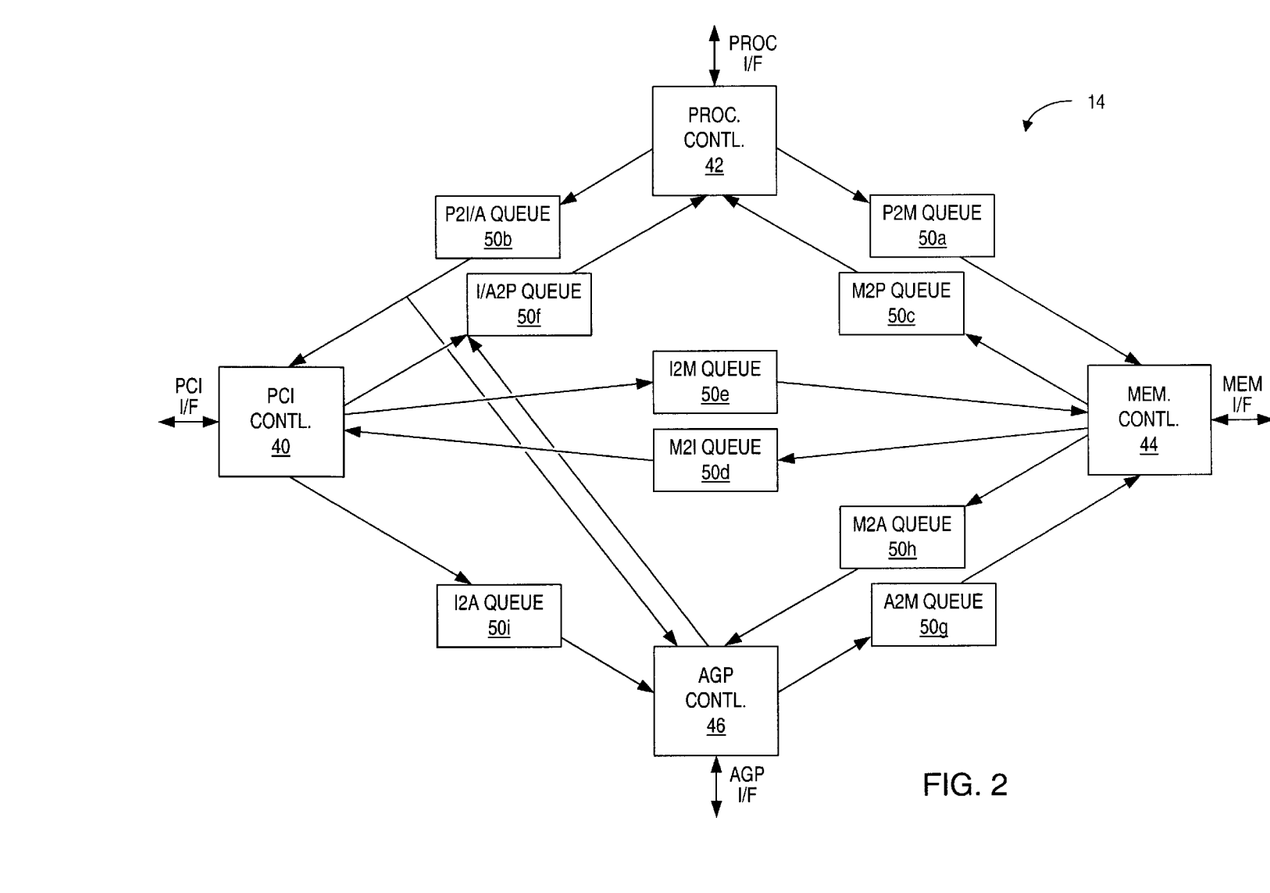
FIG. 2 is a block diagram of a bus interface unit containing address and data queues coupled between a local CPU bus, a PCI bus, a graphics bus and a system memory bus.

Turning to FIG. 2, details regarding bus interface unit 14 are shown. The various sub-components of interface unit 14 can be connected on a monolithic substrate for high end computer applications. Interface unit 14 operates in conjunction with other bus interface units such as interface unit 28, and preferably includes at least four interfaces and multiple address and data queues. Each interface is unique to the specific bus protocol of the bus to which it connects. As shown, the PCI interface ("PCI IF") includes a PCI controller 40 which enables transfer of information (control, address and data) to and from the PCI bus.

Attributed to each of the other buses is a respective controller which provides an interface for information sent across the respective bus. Thus, in addition to the PCI controller 40, a processor controller 42, a memory controller 44 and an AGP controller 46 (which includes the PCI portion of AGP, or GCI) is shown in FIG. 2. In addition to the various controllers, there are multiple address and data queues. Each controller operates independently of the others, and cycles are passed between controllers using queues which link respective controllers. FIG. 2 illustrates ten queues: processor-to-memory queue (P2M queue) 50a, processor-to-PCI/AGP queue (P2I/A queue) 50b, memory-to-processor queue (M2P queue) 50c, memory-to-PCI queue (M2I queue) 50d, PCI-to-memory queue (I2M queue) 50e, PCI/AGP-to-processor queue (I/A2P queue) 50f, AGP-to-memory queue (A2M queue) 50g, memory-to-AGP queue (M2A queue) 50h, PCI-to-AGP queue (I2A queue) 50i, and memory-to-GCI queue (M2GCI queue) 50j. It is recognized, that if needed, a PCI portion of AGP specific to graphics interface (i.e., GCI) can be used for graphics intensive applications. Each of the queues 50 shown in FIG. 2 communicate with each other through the various controllers or control signals routed directly between respective queues. Separating the major blocks as shown allows for a significant amount of concurrency.

Processor controller 42 controls the CPU interface and the various queues 50 linked to the CPU interface. Processor controller 42 allows the CPU (or processor) to pipeline cycles and allows several cycles to be stored within the processor controller. Additionally, processor controller 42 schedules accesses to cache storage locations within one or more processors.

Memory controller 44 controls possibly multiple banks of SDRAMs, as well as the CS, DQM, RAS, CAS, WE, CKE and address signals sent to those banks. In addition, memory controller 44 generates several control signals to respective queues 50 for memory data bus control. Memory controller 44 contains an arbiter 62 which arbitrates among processor writes, processor reads, PCI writes, PCI reads, refresh, and also arbitrates AGP read and writes cycles. Arbitration for each cycle is pipelined into the current memory cycle which ensures that the next memory address is available on the memory bus before the current cycle is complete. This results in minimum delay, if any, between memory cycles. Memory controller 44 is capable of reading ahead on PCI master reads and will do so if the PCI master issues a read multiple command. Interface unit 14 can then continue providing data to the PCI master at a high rate.

PCI controller 40 ensures a compatible interface to the PCI bus protocol. When the processor accesses the PCI bus, PCI controller 40 operates as a PCI master. When a PCI master, (e.g., PCI I/O device) accesses memory, PCI controller 40 acts as a PCI slave. Processor-to-PCI cycles are buffered in queue 50b and then presented to controller 40. Controller 40 must determine when this queue needs to be emptied before running in a slave mode.

Processor controller 42 can be thought of as any device responsible for decoding processor cycles, running snoops to the processor cache storage locations, and providing miscellaneous logic such as soft reset. Functionality of a processor controller used in the bus interface unit is generally well known as any unit which accepts cycles from the CPU bus and then parses them out to the appropriate controllers 40, 44, 46 and/or queues 50. It is recognized that most processor controllers consist of a number of submodules that can be grouped into various logic subsystems such as a processor bus tracker/queue cycle manager, a processor bus master state machine, snoop control, etc. Similar to the processor controller 42, the PCI controller 40 or the AGP controller 46 is also well known as containing a series of state machines which control the PCI/AGP interface. Data passing through the PCI controller 40 is preferably broken into three basic submodules: PCI master interface, PCI target interface and PCI glue logic. PCI controller 40 communicates with memory controller 44, processor controller 42 and queues 50 through various control signals internal to interface unit 14. AGP controller 46 interfaces externally to a 66 MHz, 32 bit AGP/PCI bus and interfaces internally to controllers and queues. Memory controller 44 supports AGP master reads and writes to the system memory using AGP or PCI protocol. Processor controller 42 initiates PCI protocol reads and writes to the AGP master frame buffer and registers. The various queues 50 provide data flow buffers between interfaces.

The various queues 50 can be classified as address and data queues or merely data queues depending on the flow direction of information and the controllers being linked by the respective queues. The following Table I represents a list of the various data and address queues 50, their size, and the data/address flow of each queue:

TABLE I

| Queue Name | Data/ Address | No. Locations | Source | Destination |
|---|---|---|---|---|
| P2M(A) | address | 4 slots | processor | memory |
| P2M(D) | data | 4 cache lines | processor | memory |
| P2I(A) | address | 8 slots | processor | PCI or GCI |
| P2I(D) | data | 8 quad words | processor | PCI or GCI |
| M2P | data | 2 cache lines | memory | processor |
| I2P | data | 2 cache lines | PCI or GCI | processor |

TABLE I-continued

| Queue Name | Data/ Address | No. Locations | Source | Destination |
|---|---|---|---|---|
| I2M(A) | address | 4 slots | PCI | memory |
| I2M(D) | data | 4 cache lines | PCI | memory |
| M2I | data | 2 cache lines | memory | PCI |
| M2A | data | 8 cache lines | memory | AGP |
| M2GCI(D) | data | 2 cache lines | memory | GCI |
| A2M(D) | data | 8 cache lines | GCI or AGP | memory |
| A2M(A) | address | 8 slots | GCI or AGP | memory |
| I2GCI(A) | address | 8 slots | PCI | GCI |
| I2GCI(D) | data | 8 quad words | PCI | GCI |

It is recognized that numerous other queues can be employed. It is also recognized that for a PCI or AGP peripheral device to write to memory, the respective I2M queue and A2M queue transfer both address and data information before presenting that information to the memory controller 44. Information sent from PCI controller 40 (or AGP controller 46) to processor controller 42 is buffered merely as data within the I/A2P queue 50f, and information sent from the processor controller 42 to memory controller 44 is buffered as address and data within the P2M queue 50a.

Figure 3:
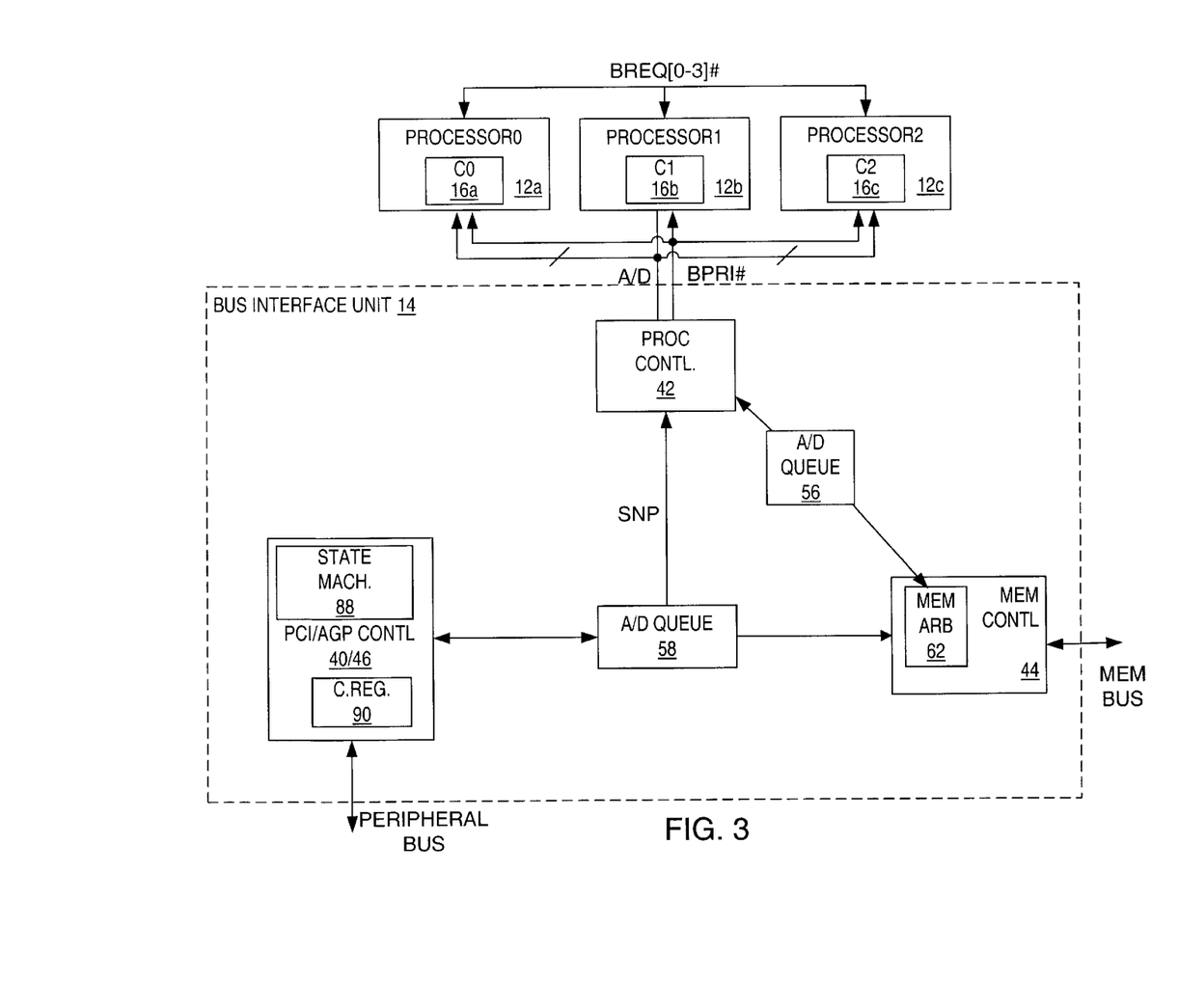
FIG. 3 is a block diagram of the bus interface unit of FIG. 2 employing address and data queues used during a write cycle from the PCI or graphics bus to system memory, and various arbitration and snoop signals involved prior to a memory arbiter granting the write cycle.

FIG. 3 illustrates a sequence of transactions which may occur during a peripheral bus write cycle to local memory. Specifically, a peripheral bus such as a PCI or AGP bus is generically connected to a PCI/AGP controller 40/46. A master on the PCI or graphics bus will initiate a write cycle and controller 40/46 will decode that cycle and perform certain operations needed to transfer information to memory via queue 58. Queue 58 waits for the data or the end of cacheline before snooping the cache storage locations 16a–c within processors 12a–c. The information is transferred as a control signal, followed by address and then data. For a read cycle from the PCI/AGP (i.e., peripheral) device, the address dispatched from controller 40/46 may also be sent to processor controller 42, which then schedules snoop accesses to cache storage locations 16. In a write transaction, however, queue 58 snoops cache 16 and if a hit-to-modified signal occurs, indicating cache 16 contains valid data at that specific address, then a writeback of that modified data is sent from cache 16 to memory 18 (FIG. 1) via memory controller 44. Queue 56 may be the P2M queue used to store writeback data under the immediately preceding condition. Thus, the writeback operation occurs only if a hit-to-modified signal arises from one of the cache storage locations 16a–c.

The snoop cycle originally dispatched from the peripheral device across the peripheral bus (PCI or AGP bus) is forwarded from queue 58 to processor controller 42. Upon receiving the snoop cycle, processor controller dispatches a priority bus request (e.g., BPRI#) across the CPU bus during an arbitration phase of the CPU bus protocol. Bus activity of the processor bus is therefore heirarchically organized into operations, transactions, and phases. Transaction can be thought of as a set of bus activities related to a single bus request. A transaction can contain up to six phases, and each phase uses a specific set of signals to communicate a particular type of information. For example, the six phases of the Pentium® Pro processor bus protocol are: arbitration, request, error, snoop, response, and data. The operations can be pipelined and some phases can be overlapped. The bus request signal initiated by processor controller 42 occurs during the arbitration phase of the CPU bus protocol. Specifically, the bus request signal initiated by the processor controller is considered a request issued from a priority agent. That is, up to five agents can simultaneously arbitrate for the CPU bus: up to four symmetric agents and one priority agent. A Pentium® Pro processor arbitrates as a symmetric agent. The priority bus interface unit 14 arbitrates on behalf of the input/output peripheral subsystem (i.e., peripheral agents) and the memory subsystem (i.e., memory agents). Owning or achieving mastership of the CPU bus is a necessary condition for initiating a bus transaction, noted as a request phase following arbitration.

Symmetric agents 12 arbitrate for the CPU bus based on a round-robin rotating priority scheme. The arbitration is fair and symmetric. After reset, agent 12a has the highest priority followed by agents 12b, 12c and, if present, another processor. All bus agents track the current bus owner. A symmetric agent requests the bus by asserting its BREQn# signal, where n=0, 1, 2, or 3. Based on the values sampled on BREQ[3:0]#, and the last symmetric bus owner, all agents simultaneously determine the next symmetric bus owner.

Assertion of BPRI# by the bus interface unit priority agent temporarily overrides, but does not otherwise alter the symmetric arbitration scheme. When BPRI# is sampled active, no symmetric agent issues another unlocked bus transaction until BPRI# is sampled inactive (i.e., is de-asserted). Besides the two classes of arbitration agents, each CPU bus agent has two actions available that act as arbitration modifiers: the bus lock operation and the request stall operation.

Figure 4:
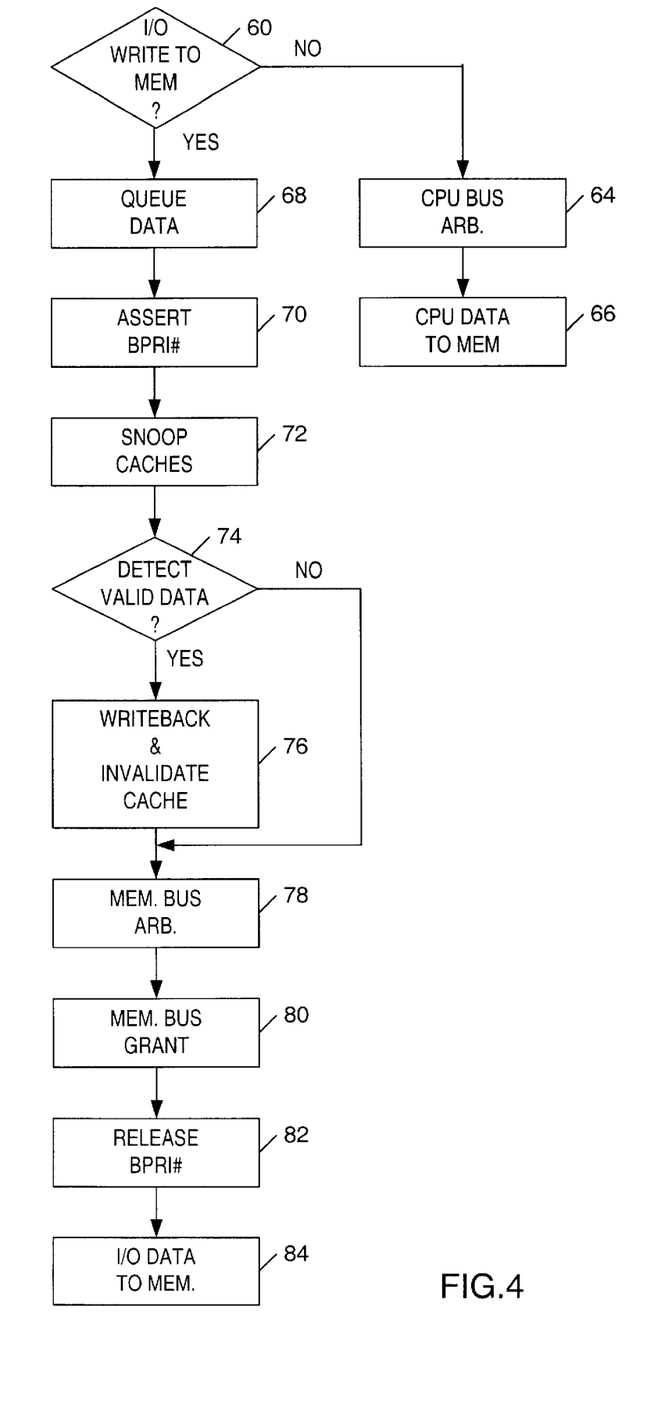
FIG. 4 is a flow diagram of arbitration, snoop and data transfer steps involved in a write cycle to system memory.

The bus locked action is available to the current symmetric owner to block other agents, including the priority agent, from acquiring the bus. Typically, a bus lock operation consists of two or more transactions issued on the CPU bus as an indivisible sequence (this is indicated on the bus by the assertion of the LOCK# pin). Once the symmetric bus owner has successfully initiated the first bus lock transaction, it continues to issue remaining requests that are part of the same indivisible operation without releasing the bus. The request stall action is available to any bus agent that is unable to accept new bus transactions. By asserting a signal (BNR#) any agent can prevent the current CPU bus owner from issuing new transactions. The symmetric agent bus request signal BR[3:0]#, the priority agent bus request signal BPRI#, the block next request signal BNR# and the LOCK# signal are signals initiated during the arbitration phase of the CPU bus protocol. FIG. 4 illustrates arbitration, snoop and data transfer steps involved in a peripheral write cycle to system memory.

Referring to FIGS. 3 and 4 in combination, determination must be made on whether a peripheral device is attempting to write to system memory. Memory arbiter 62 will automatically grant mastership of a CPU cycle to the memory bus in lieu of a peripheral bus transaction. First, however, the CPU bus protocol involves an arbitration phase which will grant ownership of the CPU bus to a bus agent. CPU bus arbitration is shown as block 64. Once ownership is granted, the processor which has ownership can then transfer data to memory during a data transfer phase, as shown by block 66.

If a peripheral device (i.e., I/O device) coupled to the peripheral bus initiates a write cycle, the write transaction is decoded by the bus interface unit and, more specifically, controller 40/46. Along with control and address signals, data attributed to the peripheral-derived write cycle is stored within a queue of bus interface unit 14. The queuing of data is shown as step 68, and involves storing an address, followed by data, within queue 50.

The control signals involved in the peripheral bus transfer are, in part, forwarded to processor controller 42 via, e.g., queue 58. Processor controller 42 responds as a priority agent by requesting ownership of the CPU bus. Accordingly, processor controller 42 asserts BPRI#, as shown by reference numeral 70. Once CPU bus ownership is granted during its arbitration phase, a snoop cycle within a subsequent snoop phase is asserted to cache memory location 16. The contents of addresses involved in the write cycle are snooped within cache location 16, as shown by reference numeral 72.

If the cache location 16 contains the most recent, modified or dirty data (valid data) 74, then a writeback operation must be undertaken 76. Writeback involves writing the valid data from a respective cache location 16 to the same address within system memory. Once writeback is complete, then the storage location containing valid data within cache 16 is marked "invalid."

If most recent, modified or dirty data (valid data) is not detected within the cache storage locations, then writeback and invalidation are avoided. This allows the peripheral device to request mastership of the memory bus via memory arbiter 62. Arbitration of the memory bus occurs after writeback, if writeback is present, and is shown as reference numeral 78. Since the bus interface unit and, specifically, processor controller 42 maintains ownership of the CPU bus, symmetric bus agents such as processors 12a, 12b, etc. cannot implement a cycle upon the CPU bus. This ensures that memory arbiter 62 will not see a bus request from any agent other than a peripheral or I/O agent. Accordingly, the peripheral device will always be granted ownership of the memory bus while the bus interface unit maintains ownership of the CPU bus. Once the memory bus is granted 80 to the peripheral write cycle, then the write cycle will complete upon the memory bus regardless of a processor thereafter gaining ownership of the CPU bus. For this reason, BPRI# is maintained asserted until after the memory bus arbiter grants mastership to the peripheral-derived write cycle. As shown in FIG. 4, BPRI# is released 82 after the memory bus is granted 80. In this fashion, I/O data can be transferred (i.e., written) to memory 84 prior to memory arbiter 62 granting mastership to an immediately succeeding CPU derived read cycle, for example. This ensures a location within memory is updated by the peripheral device before being called upon by the CPU.

Figure 5:
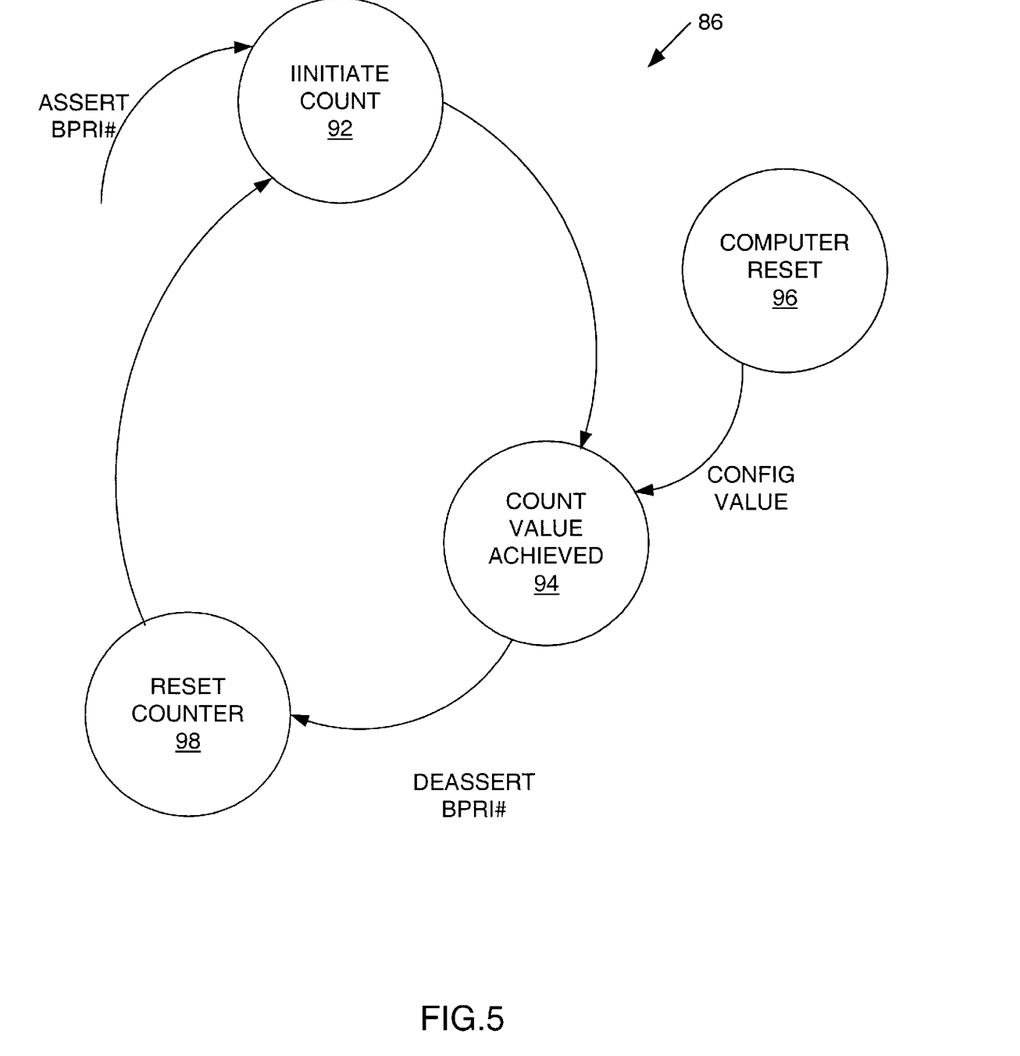
FIG. 5 is a state diagram of the state machine shown in FIG. 4 configured to a variable count value which is decremented in accordance with a number of snoop cycles that can be forwarded across the CPU bus during a single assertion of priority bus request ("BPRI#") from the bus interface unit.

FIG. 5 illustrates a state diagram 86 of various states at which a state machine 88 (shown in FIG. 3) can reside. The state machine can be programmed so that a pre-defined number of snoop cycles can be dispatched to processor controller 42 (FIG. 3) and eventually to the CPU bus during the time in which BPRI# is asserted. The number of pre-defined snoop cycles is determined based on a bit pattern programmed within configuration register 90 (FIG. 3). The number of snoop cycles which can be forwarded by the processor controller during assertion of the bus request signal BPRI# is determined by the bit pattern forwarded to the configuration space when the computer system is first powered on, reset or booted.

When a computer is powered on, reset or booted, configuration software scans the peripheral bus (PCI and AGP) to determine what peripheral devices exist and the particular configuration requirements of each device. This process is referred as scanning, walking, probing or enumerating the bus. In order to facilitate this operation, all peripheral devices including bus interface unit 14 must implement a base set of configuration registers defined within the configuration address space. Accordingly, software drives initialization and configuration via a separate configuration address space containing a substantial amount of sequential logic clocked by the clocking signal. The PCI specification allocates a maximum of 256 addressable bytes for configuration purposes. Typically, a PCI device requires approximately 128 bytes of configuration registers for the purpose of configuration.

Configuration register 90 (shown in FIG. 3) is written to during a configuration cycle. A configuration cycle is a read or write cycle to the internal configuration address space attributed to the peripheral bus (i.e., the PCI bus). Typically, accesses to a configuration address register are initiated by a processor accessing an input/output address space. The bus interface unit may need to translate that address space before accessing a configuration address space associated with a peripheral device. The conversion of pre-defined I/O accesses into configuration accesses on the peripheral bus is known as the translation process. There are many well known types of translations that can occur by a bus interface unit.

Regardless of whether translation is required or the type of translation used, configuration register 90 is established to store configuration bits within a configuration address space of one or more peripheral devices. Depending on the bits stored within register 90, either one, two, three or four snoop cycles can be programmed, for example, to occur during a single assertion of BPRI#.

Shown in FIG. 5, assertion of BPRI# initiates count 92. The count is incremented for as many times as needed to achieve a pre-defined count value 94. The count value is set within the configuration register during times when the configuration address space is written to by the CPU. More specifically, data within the configuration register is written to or modified during times when the computer is first powered on, reset or booted 96.

After the pre-defined number of snoop cycles have been achieved, BPRI# is de-asserted and the counter is reset to a zero value 98. The count number is maintained at zero until the BPRI# signal is again asserted.

While the invention may be modified and have alternative forms, specific embodiments are shown by way of example in the drawings. It should be understood, however, that the drawings and detailed description thereto are not intended to limit the invention to a particular form. But on the contrary, the intention is to cover all modifications, equivalents and alternatives falling within the spirit and scope of the present invention as defined by the appended claims.

What is claimed is:

1. A computer, comprising:
   a central processing unit (CPU) coupled to a CPU bus;
   a memory coupled to a memory bus;
   a peripheral device coupled to a peripheral bus; and
   a bus interface unit coupled between the CPU bus, the memory bus and the peripheral bus, wherein the bus interface unit is configured to forward a bus request signal to the CPU bus in response to receiving a write cycle from the peripheral bus to the memory bus, wherein the bus request signal is maintained asserted until the memory bus grants ownership to the write cycle, and wherein said bus request signal grants ownership of the CPU bus to the bus interface unit in lieu of other bus request signals forwarded from the CPU.

2. The computer as recited in claim 1, wherein said peripheral bus comprises a peripheral component interconnect (PCI) bus.

3. The computer as recited in claim 1, wherein said peripheral bus comprises an advanced graphics port (AGP).

4. The computer as recited in claim 1, wherein said peripheral device is maintained is coupled to or mounted upon a printed circuit board separate from another printed circuit board to which the CPU is coupled or mounted.

5. The computer as recited in claim 1, wherein said bus interface unit comprises a buffer configured to store at least one snoop signal and forwards said at least one snoop signal to a cache storage location within the CPU after the bus interface unit forwards the bus request signal to the CPU bus.

6. The computer as recited in claim 1, wherein said bus interface unit is a priority agent which achieves arbitration priority over said CPU whenever said bus request signal is dispatched.

7. The computer as recited in claim 1, wherein the CPU bus dispatches a read cycle from the CPU after the peripheral bus dispatches the write cycle from the peripheral device.

8. The computer as recited in claim 7, wherein the bus interface unit comprises a memory arbiter which grants ownership of the memory bus to the write cycle prior to granting ownership of the memory bus to the read cycle.

9. The computer as recited in claim 1, wherein the peripheral device comprises a disk drive.

10. The computer as recited in claim 1, wherein the peripheral device comprises an electronic display.

11. The computer as recited in claim 1, wherein the peripheral device comprises an a keyboard.

12. A method for performing a write cycle from a peripheral device to system memory, comprising:
    upon receiving the write cycle by a bus interface unit, forwarding a bus request signal from the bus interface unit for obtaining ownership of a central processing unit (CPU) bus;
    maintaining the bus request signal and ownership of the CPU bus until after the write cycle is granted ownership of a local memory bus connected to the system memory; and
    transferring address and data information from the peripheral device to system memory via one or more queues within the bus interface unit.

13. The method as recited in claim 12, wherein said forwarding comprises dispatching a snoop signal across the CPU bus to cache memory within a CPU linked to the CPU bus.

14. The method as recited in claim 12, wherein said forwarding comprises dispatching the bus request signal from the bus interface unit to a plurality of symmetric bus agents coupled to the CPU bus for obtaining ownership of the CPU bus in lieu of the symmetric bus agents obtaining ownership.

15. The method as recited in claim 12, wherein said forwarding comprises arbitrating for the CPU bus and being granted ownership thereof.

16. The method as recited in claim 12, wherein said maintaining comprises preventing grant of the CPU bus to a CPU until after the bus request signal is deasserted.

17. The method as recited in claim 12, wherein said maintaining comprises preventing grant of the CPU bus to a CPU until after the write cycle is granted ownership of the local memory bus.

18. The method as recited in claim 12, wherein said maintaining comprises granting ownership of the memory bus to a CPU after the bus request signal is deasserted and data associated with the write cycle has been transferred across the memory bus.

* * * * *